Nov. 8, 1960     E. H. HARTEL     2,959,381
RETRACTABLE LANDING GEAR
Filed Aug. 28, 1957     3 Sheets-Sheet 1
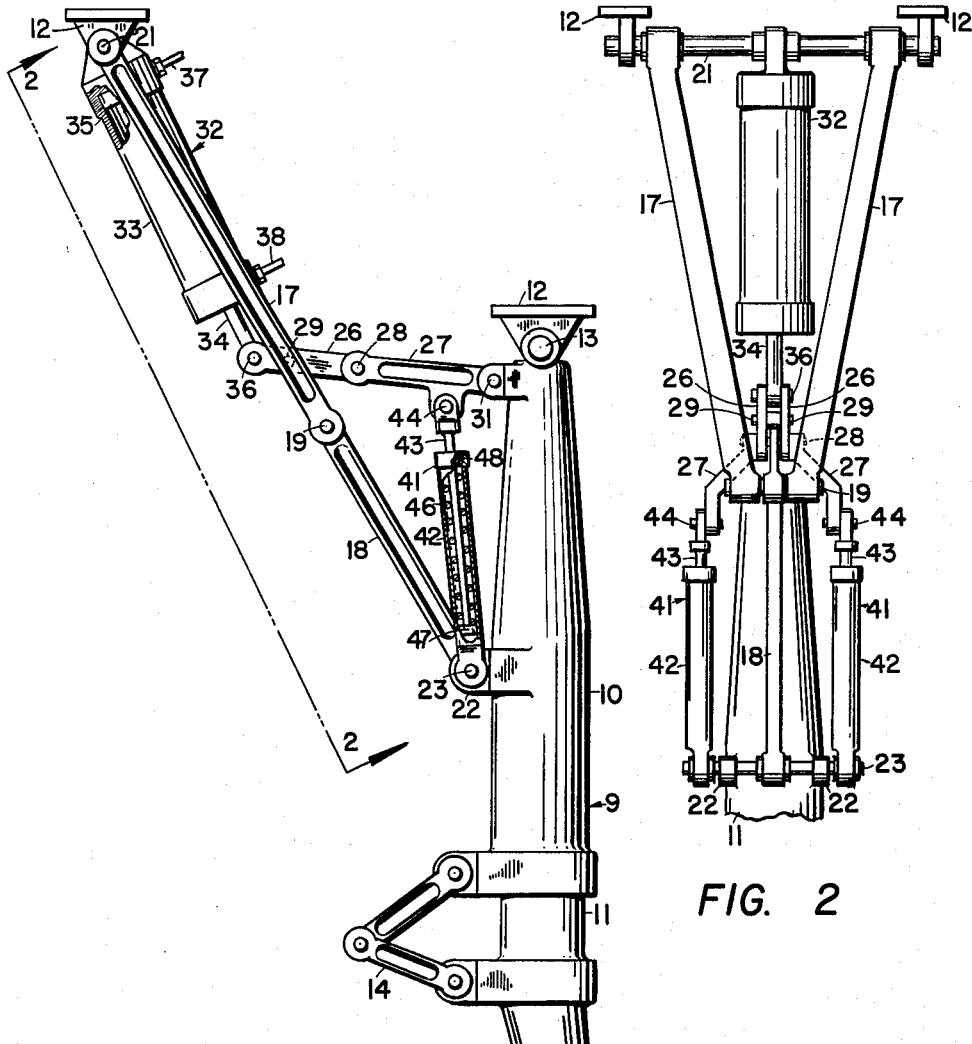
FIG. 1
FIG. 2
INVENTOR.
ERWIN H. HARTEL
BY
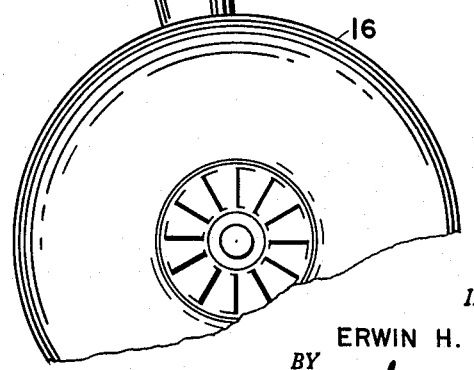
ATTORNEY Nov. 8, 1960
E. H. HARTEL
2,959,381
RETRACTABLE LANDING GEAR
Filed Aug. 28, 1957
3 Sheets-Sheet 2
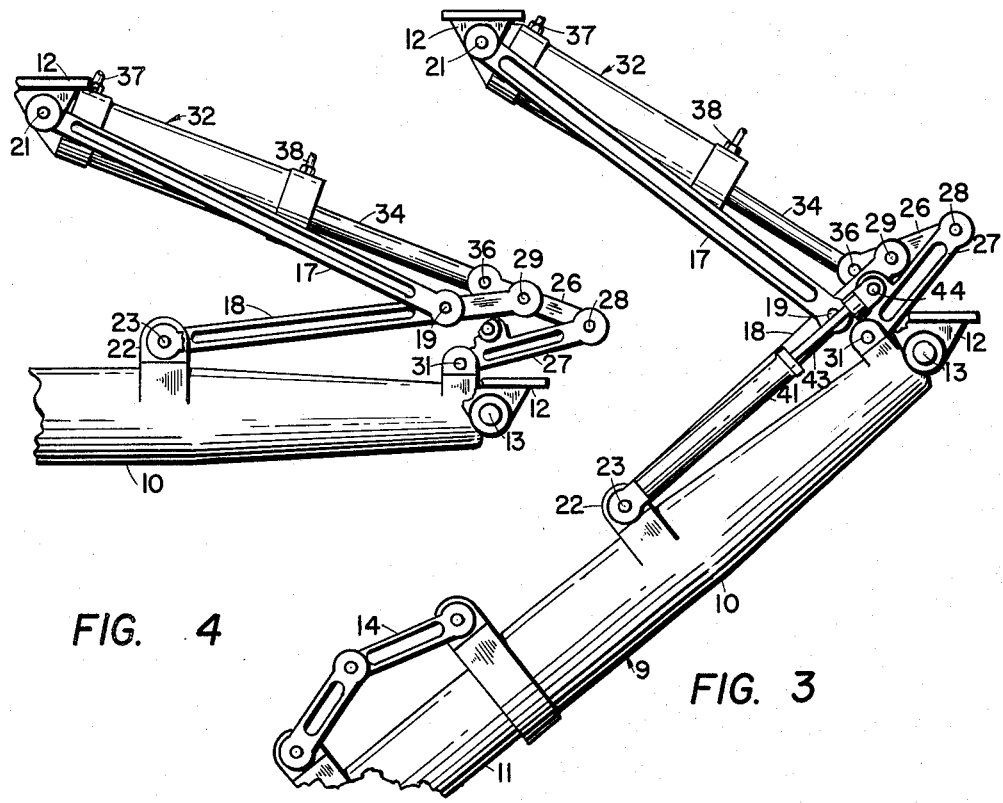
FIG. 4
FIG. 3
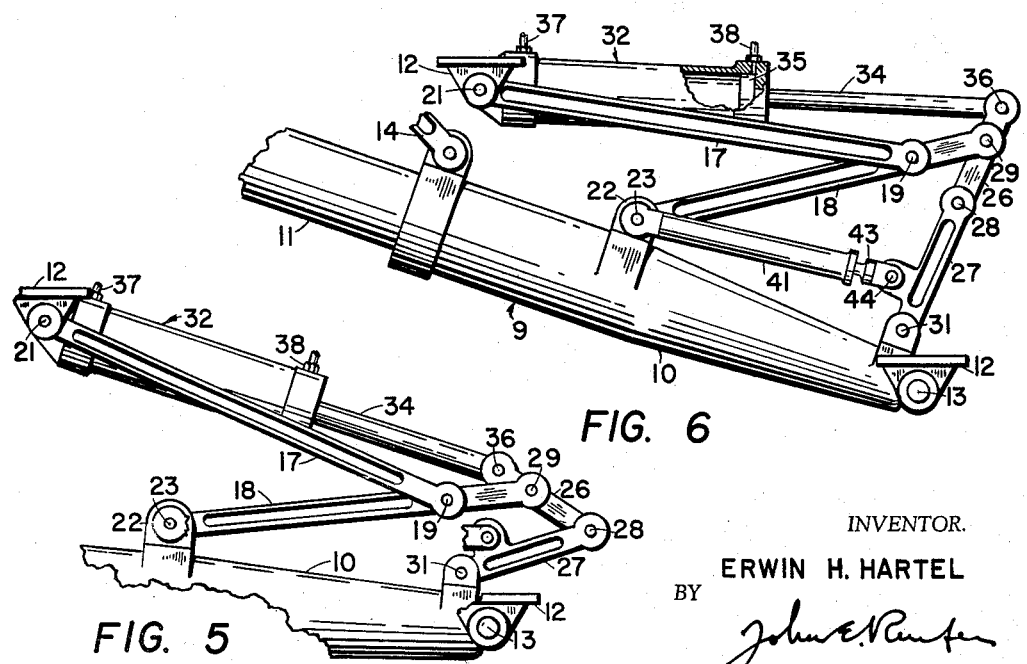
FIG. 6
FIG. 5
INVENTOR.
ERWIN H. HARTEL
BY
*John E. Rumfer*
ATTORNEY

United States Patent Office 2,959,381
Patented Nov. 8, 1960

2,959,381
RETRACTABLE LANDING GEAR

Erwin H. Hartel, Cleveland, Ohio, assignor to Cleveland Pneumatic Industries, Inc., Cleveland, Ohio, a corporation of Ohio Filed Aug. 28, 1957, Ser. No. 680,800

11 Claims. (Cl. 244—102)

This invention relates to aircraft landing gears in general and more particularly to a new and improved landing gear and retraction mechanism.

It is an important object of this invention to provide a retractable landing gear which is attached to the aircraft frame at only two points.

It is another important object of this invention to provide a new and improved retraction mechanism for aircraft landing gears where the locking in the retracted and extended position is accomplished by merely bottoming the retraction actuator.

It is another object of this invention to provide a retractable landing gear which is secured in either the extended or retracted position without the use of latch type locks or the like.

It is still another object of this invention to provide a retraction mechanism wherein the available retraction moment curve closely follows the required retraction moment curve for the mechanism so that a relatively small actuator can be used to provide the retraction operation.

It is still another object of this invention to provide a landing gear retraction mechanism which is spring loaded by a single spring mechanism in either the extended or retracted position which spring loading mechanism is capable of maintaining a landing gear in either position in the event hydraulic pressure to the retraction actuator fails.

Further objects and advantages will appear from the following description and drawings, wherein:

Figure 1 is a side elevation partially in section of a landing gear incorporating this invention shown in the extended position;

Figure 2 is a side elevation taken along 2—2 of Figure 1;

Figure 3 is a side elevation similar to Figure 1 showing the position the elements assume when the landing gear is in a half retracted position;

Figure 4 is a fragmentary view with parts removed for clarity showing the position the elements assume when the lock links start to return to their aligned position;

Figure 5 is a view similar to Figure 4 showing the lock links as they extend to their aligned position;

Figure 6 is a side elevation showing the position of the elements of the retraction mechanism in the fully retracted position with the lock links aligned;

Figure 7:
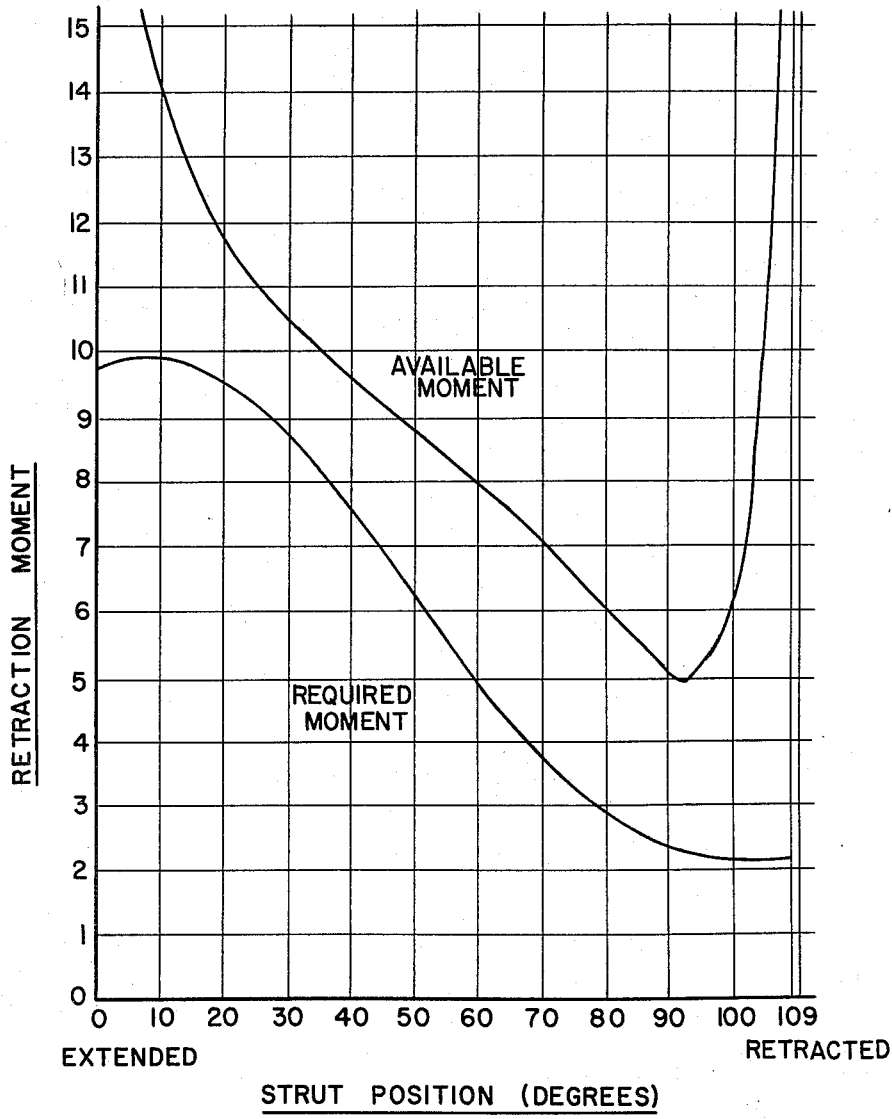
Figure 7 is a graph showing the relationship between the available retraction moment of the retraction mechanism compared to the required retraction moment for the landing gear system.

Referring to the drawings a strut 9 includes an upper telescoping member 10 and a lower telescoping member 11 provided with the conventional internal fluid spring and damping means which resiliently urges the lower telescoping member 11 downwardly to resiliently support the weight of the aircraft on the ground. The upper telescoping member 10 is pivotally connected to the frame of an aircraft herein represented by the two pads 12 by a pivot pin 13 and torque arms 14 are connected between the two telescoping members 10 and 11 to prevent relative rotation therebetween. If steering is required a steering motor of the type disclosed in the United States patent to Walter H. Hogan, No. 2,779,556 can be connected between the torque arms 14 and the upper telescoping member 10. To complete the assembly, of course, a landing wheel 16 is journaled on the lower end of the lower telescoping member 11. Since the strut 9 itself forms no part of this invention excepting insofar as it co-operates with the retraction mechanism, the specific details of the structure are not material.

The strut 9 is rotatable about the pivot pin 13 from the extended position shown in Figure 1 to the retracted position in Figure 4. When the landing gear is in the extended position of Figure 1 the wheel 16 projects below the fuselage of the aircraft and it is in the position for landing operation. After the aircraft is airborne the strut 9 is moved to the retracted position of Figure 4, at which time the entire landing gear is contained within the frame of the aircraft.

To control the movement of the strut 9 around the pivot 13 I utilize a retraction mechanism which includes a pair of drag links 17 and 18 pivoted together for rotation around a connecting pivot 19. The upper drag link 17 is pivotally connected to the frame 12 by a pivot pin 21 for rotation around the axis thereof and the lower drag link 18 is pivotally connected to a pair of lugs 22 formed on the upper telescoping member 10 by a pivot pin 23. As shown in Figure 2 the upper drag link 17 actually comprises two links which co-operate to form a relatively narrow V but in operation they can be considered a single link.

When the landing gear is in the extended position the two drag links 17 and 18 are arranged in a single plane coincident with the pivots 19, 21, and 23, thereby preventing pivotal movement of the strut about the pivot 13. To maintain the drag links 17 and 18 in their aligned position I use a pair of lock links 26 and 27 which are connected together by a pivot pin 28. The lock link 26 is pivotally connected to the drag link 18 by a pivot pin 29 and the lock link 27 is pivotally connected to the upper telescoping member 10 by a pivot pin 31. When the landing gear is in the extended position of Figure 1 the two lock links 26 and 27 are in a single plane coincident with the pivot pins 29, 28, and 31. When the lock links 26 and 27 are aligned they form in co-operation with the lower drag link and the upper telescoping member 10 a rigid triangle which prevents the two drag links 17 and 18 from folding. Again since the two drag links 17 and 18 cannot fold the strut 9 is maintained in the extended position.

A retraction actuator 32 is utilized to rotate the landing gear between the retracted and the extended position. The preferred actuator 32 includes a cylinder 33 pivotally connected to the pivot pin 21 and a piston 34 pivotally connected to the lock link 26 by a pivot pin 36. The piston 34 co-operates with the cylinder 33 in the conventional manner to form a hydraulic motor so if fluid under pressure is supplied to a first pressure line 37 and a second pressure line 38 is connected to a reservoir return a force is developed on a piston head 35 on the piston 34 which urges the piston 34 downwardly out of the cylinder 33. If the hydraulic connections are reversed and pressure fluid is supplied to the pressure line 38 while the line 37 is connected to the reservoir return the piston head 35 and the piston 34 are urged inwardly relative to the cylinder 33. The proportions of the actuator 32 are arranged so that the piston head 35 bottoms at the inner end of the cylinder 33 when the lock links 26 and 27 are aligned and the strut 9 is in the extended position. Therefore, the actuator itself operates as a stop to properly position the two lock links.

In order to insure that the lock links are maintained in the locked position with the piston head 35 against the bottom of the cylinder 33 even if hydraulic fluid pressure is not supplied to the actuator, I utilize a pair of spring devices 41. The two spring devices 41 are similar in structure and are symmetrically mounted on either side of the lock link 27 as shown in Figure 2. The link 27 is, in fact, a pair of opposed similar links which co-operate to function as a single link so the discussion will cover them as a single unitary link even though two links are provided to insure symmetrical loading. Each of the spring devices 41 includes a cylinder member 42 pivotally connected to the pivot pin 23 at its lower end and provided with a plunger 43 which extends into, and is axially movable relative to, the cylinder member 42. The plunger member 43 is pivotally connected to the associated lock links 27 by pivot pins 44. A spring 46 is positioned between a head 47 on the plunger member 43 and a stop nut 48 threaded into the upper end of the cylinder 42 and produces a force which tends to rotate the lock link 27 in a counter-clockwise direction around the pivot pin 31 which in turn produces a force in the lock link 26 tending to rotate it in a clockwise direction around the pivot pin 29. This in turn produces a force urging the piston 34 upwardly relative to the cylinder 33 and maintains the piston head 35 in its bottom condition.

When it is desired to retract the strut 9 fluid under pressure is supplied to the pressure line 37 and the pressure line 38 is connected to the reservoir return. This produces a downward force which extends the piston 34, overcoming the action of the spring 46 and rotates the lock link 26 in a counter-clockwise direction around the pivot pin 29. This also causes the lock link 27 to rotate in a clockwise direction around the pivot pin 31 and shortens the distance between the two pivot pins 29 and 31. This motion initiates the folding inwardly with respect to the strut of the two drag links 17 and 18 and causes the strut 9 to start to rotate in a clockwise direction around the pivot pin 13 toward the retracted position. As the strut moves to the retracted position the various elements pass through the position shown in Figure 3 which is the half retracted position of the landing gear. At this time the two lock links 26 and 27 are substantially folded and the two drag links 17 and 18 are in the half folded position.

As the piston 34 continues to extend under the influence of pressure fluid the various elements move to the position of Figure 4 at which time the lock link 26 is aligned with the piston 34. It is at this point that the lock links begin to return to their aligned position and continued movement of the piston 34 causes the elements to pass through the position of Figure 5 at which time an extending force on the piston 34 develops a moment on the lock link 26 tending to rotate it in a clockwise direction around the pivot pin 29. This moment causes the lock links to move to the aligned position of full retraction shown in Figure 6.

A comparison of Figure 3 and Figure 6 show that the lock links 26 and 27 have again moved to an aligned position and that the drag links 17 and 18 are in the folded position. At this time the strut 9 is fully retracted and the piston head 35 is bottomed in the extended position. Because the two lock links 26 and 27 are aligned they prevent rotation of the drag link 18 around the pivot pin 23 by forming in co-operation with strut 9 a rigid triangle and, therefore, prevent relative rotation between the drag links 17 and 18. The force of the springs 41 again urges the lock link 27 in the counter-clockwise direction and through the connection of the lock link 26 urge the piston head 35 against the outer end of the cylinder 33. The various proportions are arranged so that the piston head 35 will be bottomed when the two lock links 26 and 27 are aligned and the springs 41 again provide a resilient force maintaining the landing gear in the retracted position even if fluid under pressure is released from the actuator 32.

Those skilled in the art will recognize that the preferred structure provides locking of the retraction mechanism in both the extended and retracted position without the use of latch type locks and that the length of the stroke of the actuator 32 is arranged so that bottoming of the actuator in either of its two end positions serves to lock the system. Since the stops are contained within the actuator itself overstraining of the linkage due to actuator overtravel is eliminated. Again since the retraction mechanism itself provides the locking it is not necessary to supply additional mounting points or latch points in the frame of the aircraft which, of course, would complicate the aircraft frame structure. In practice it is desirable to provide stop adjustments in the actuator 32 to adjust the stroke of the piston 34 to compensate for manufacturing tolerances of the linkage.

To extend the strut 9 it is merely necessary to connect the pressure fluid to the line 38 and connect the line 37 to the reservoir return. This produces a force which moves the piston 34 to the left and rotates the lock link 26 in a counter-clockwise direction against the force of the spring devices 41. Such action moves the retraction linkage back through the position of Figure 3 to the fully extended position of Figure 1, at which time the linkage is again locked in the extended position. Because the drag links 17 and 18 are aligned in the extended position large lateral forces can be applied to the strut 9 without producing large forces in the lock links 26 and 27. Again since the two lock links 26 and 27 are in the aligned position a relatively small force can be applied by the springs 26 to overcome any force encountered tending to rotate the strut 9 around the pivot pin 13. In other words the springs 41 have a very large mechanical advantage and a relatively small spring force can provide sufficient locking action. It may be desirable to arrange the actuator 32 so that the pivot pin 26 moves slightly over the center when the landing gear is in the extended position. This would provide additional safety since any tendency for the two drag links 17 and 18 to fold would merely cause the piston head 35 to be urged with a greater force against the end of the cylinder 33.

Referring to Figure 7, if it is assumed that a constant pressure is supplied to the actuator 32 the actuator will provide a pre-determined constant force through the length of its stroke. Due to the mechanical operation of the various linkage this acuator force will appear as a moment tending to rotate the strut 9 around the pivot pin 13 and the moment will have a magnitude which varies as the strut 9 moves between a fully extended and fully retracted position. The "Available Moment" curve is a plot of this torque in the various positions of the strut 9. An inspection of this curve will show that the available moment is large when the strut 9 is near to the extended position, that the available moment drops as the strut moves toward the retracted position and again increases sharply when the strut 9 reaches the retracted position. Now referring to the required moment curve, which is a plot of moment necessary to cause retraction of a typical landing gear. The required moment is highest as the strut moves away from the extended position and drops off as the strut moves to the retracted position. This is due to the fact that the projected area of the strut which is in the aircraft slip stream is largest when the strut is in the extended position and drops off as the strut moves toward the retracted position. This type of curve is only characteristic for landing gears which are retracted forward against the slip stream but such gears are preferred because the gears will free fall to the extended position without power. It is true that the weight of the strut itself becomes more significant as the strut approaches the retracted position, but it is a small factor of the retraction load when compared to the slip stream forces. It is apparent that the available moment curve tends to follow the required moment curve through the larger portion of the retraction movement so the actuator 32 operates efficiently to provide sufficient force for retraction in all positions without providing excessive available moments. The high available torque at the two extreme positions provides a safety factor since it insures that the strut will always move into its fully locked position.

If for some reason the pressure supplied to the actuator 32 fails when the landing gear is moving toward the extended position, the action of the slip stream will move the strut 9 to the fully extended position with the help of the force produced by the springs 41. In other words, once the strut starts to extend both the slip stream and the springs 41 operate to bias the strut to the fully extended position so that it will automatically lock in the extended position even if there is a failure of supply pressure to the actuator 32. If it is desired to provide an alternative method of extending the gear for emergency use it is merely necessary to provide a device that can be manually operated, which engages lock link 26 adjacent to the pivot pin 36 and produces a force to the left as viewed in Figure 4. Such a device would merely have to overcome the action of the spring 41 to unlock the gear which would then free fall to the fully extended position.

Although the preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description is determinative of the scope of the invention.

I claim:

1. A retractable landing gear mechanism comprising a strut member pivotally connected to an aircraft frame member for motion between an extended and retracted position, a sectional drag link having pivotal end connections with said strut and frame member, an intermediate pivot connecting said drag link sections, said intermediate connection being located on a line connecting said end connections when said strut is in said extended position, a pair of elongated lock links pivotally connected together and having pivotal end connections with said drag link and one of said members, said lock links being aligned when said strut is in both of said positions and pivotable relative to each other during movement of said strut member between said two positions, and motor means operatively connected to said strut effecting movement thereof between said positions.

2. A retractable landing gear mechanism comprising a strut member pivotally connected to an aircraft frame member for motion between an extended and retracted position, a pair of pivotally connected elongated drag links having pivotal end connections with said strut and frame members, said drag links being in alignment when said strut member is in said extended position, a pair of elongated lock links pivotally connected together and having pivotal end connections with one of said drag links and with one of said members, said lock links aligned when said strut member is in both of said positions and pivotable relative to each other during movement of said strut member between said two positions, motor means connected to said links effecting movement of said strut between said positions, and spring means biasing said lock links toward alignment with each other.

3. A retractable landing gear mechanism comprising a strut member pivotally connected to an aircraft frame member for motion between an extended and retracted position, a sectional drag link having pivotal end connections with said strut and frame members, an intermediate pivot connecting said drag link sections, said intermediate connection being located on a line connecting said end connections when said trut is in said extended position, a pair of elongated lock links pivotally connected together and having pivotal end connections with said drag link and said strut, said lock links being aligned when said strut is in both of said positions and pivotable relative to each other during movement of said strut member between said two positions, and motor means operatively connected to said strut effecting movement thereof between said positions.

4. A retractable landing gear comprising a strut pivoted to an aircraft frame member for motion between an extended and retracted position, a first drag link pivoted to said frame member, a second drag link pivoted to said strut member and to said first drag link, the pivot connecting said drag links being positioned directly between the pivots connecting said links to said frame and strut when said strut is in said extended position, single lock means connecting said strut and second link normally locking said second link in the same position relative to said strut when said strut is in each of said positions, and actuating means operatively connected to said lock means and links operable to effect release of said lock means and movement of said strut between said extended and retracted positions.

5. A retracable landing gear comprising a strut pivoted to an aircraft frame for motion between an extended and retracted position, a first drag link pivoted to said frame, a second drag link pivoted to said strut and to said first drag link, the pivot connecting said drag links being positioned directly between the pivots connecting said links to said frame and strut when said strut is in said extended position, single lock means connecting said strut and second link normally locking said second link in the same position relative to said strut when said strut is in each of said positions, and motor means including two elements movable relative to each other through a pre-determined stroke, one of said motor elements being connected to said frame and the other to said lock means, said relative movement between said elements effecting release of said lock means and movement of said strut between said extended and retracted positions.

6. A retractable landing gear mechanism comprising a strut member pivotally connected to an aircraft frame member for motion between an extended and retracted position, a sectional drag link having pivotal end connections with said strut and frame members, an intermediate pivot connecting said drag link sections, said intermediate connection being located on a line connected by said end connections when said strut is in said extended position, a pair of elongated lock links pivotally connected together and having pivotal end connections with said drag link and said strut, said lock links being aligned when said strut is in both of said positions and pivotable relative to each other during movement of said strut member between said two positions, and motor means having an output element movable between a pair of stroke limiting stops connected to one of said lock links operative to move said strut between said extended and retracted position, said output element engaging one of said stops when said strut is in said retracted position and the other of said stops when said strut is in said extended position.

7. A retractable landing gear mechanism comprising a strut member pivotally connected to an aircraft frame member for motion between an extended and retracted position, a sectional drag link having pivotal end connections with said strut and frame member, an intermediate pivot connecting said drag link sections, said intermediate connections being located on a line connected by said end connections when said strut is in said extended position, a pair of lock links pivotally connected together and having pivotal end connections with said drag link and said strut, said lock links being aligned when said strut is in both of said positions and pivotable relative to each other during movement of said strut member between said two positions, and motor means having an output element movable between a pair of stroke limiting stops connected to one of said lock links operative to move said strut between said extended and retracted position, said output element engaging one of said stops when said strut is in said retracted position and the other of said stops when said strut is in said extended position, and spring means operatively connected to said output member producing a force maintaining it against the stop engaged thereby.

8. A retractable landing gear meachanism comprising a strut member pivotally connected to an aircraft frame member for motion between an extended and retracted position, a pair of pivotally connected sectional drag links having pivotal end connections with said strut and frame members, a pair of elongated lock links pivotally connected together and having pivotal end connections with said drag link and one of said members, said lock links being aligned when said strut is in both of said positions and pivotable relative to each other during movement of said strut member between said two positions, motor means having an output element movable between a pair of stroke limiting stops connected to one of said lock links operative to move said strut between said extended and retracted position, said output element engaging one of said stops when said strut is in said retracted position and the other of said stops when said strut is in said extended position, and spring means operatively connected to said lock links resiliently urging them toward alignment.

9. A retractable landing gear mechanism comprising a strut member pivotally connected to an aircraft frame member for motion between an extended and retracted position, a sectional drag link having pivotal end connections with said strut and frame members, an intermediate pivot connecting said drag link sections, a pair of elongated lock links pivotally connected together and having pivotal end connections with said drag link and said strut, said lock links being aligned when said strut is in both of said positions and pivotable relative to each other during movement of said strut member between said two positions, fluid motor means having an output element movable under the influence of fluid under pressure between a pair of stroke limiting stops connected to one of said lock links operative to move said strut between said extended and retracted position, said output element engaging one of said stops when said strut is in said retracted position and the other of said stops when said strut is in said extended position, and means maintaining said output element against the engaged stop in the absence of fluid under pressure.

10. A retractable landing gear comprising a strut pivoted to an aircraft frame for motion around a first axis between an extended and retracted position, a first drag link pivoted to said frame for motion about a second axis spaced from said first axis, a second drag link pivoted to said strut for motion relative thereto around a third axis spaced from said first and second axes, a pivot connecting said drag link for relative motion around a fourth axis which is contained in a plane through said second and third axes when said strut is in said extended position, a pair of elongated lock links pivotally connected together and having end pivots with said second drag link and strut, said lock links being in alignment with each other when said strut is in said retracted and said extended positions, and motor means including a first element pivotally connected to said frame for motion around said second axis and a second element movable relative thereto under the influence of fluid under pressure, said second element being pivotally connected to said lock links operable to effect movement of said strut between said extended and retracted positions.

11. A retractable landing gear comprising a strut pivoted to an aircraft frame for motion around a first axis between an extended and retracted position, a first drag link pivoted to said frame for motion about a second axis spaced from said first axis, a second drag link pivoted to said strut for motion relative thereto around a third axis spaced from said first and second axes, a pivot connecting said drag link for relative motion around a fourth axis which is contained in a plane through said second and third axes when said strut is in said extended position, a pair of elongated lock links pivotally connected together and having end pivots with said second drag link and strut, said lock links being in alignment with each other when said strut is in both said retracted and said extended positions, a cylinder pivotally connected to said frame for motion around said second axis, and a piston movable relative to said cylinder under the influence of fluid under pressure, said piston being pivotally connected to said lock links, movement of said piston effecting movement of said strut between said extended and retracted positions, said cylinder being formed with a first stop engaged by said piston where said strut is in said extended position and a second stop engaged by said piston when said strut is in said retracted position.

References Cited in the file of this patent

UNITED STATES PATENTS

| | | |
|---|---|---|
| 2,374,146 | Waters | Apr. 17, 1945 |
| 2,497,415 | Parker | Feb. 14, 1950 |
| 2,661,171 | Allen | Dec. 1, 1953 |

FOREIGN PATENTS

| | | |
|---|---|---|
| 524,929 | Great Britain | Aug. 19, 1940 |